Aug. 28, 1962

K. J. BRAUN 3,051,374

HAND PUNCHES

Filed Aug. 31, 1959

4 Sheets-Sheet 1

Inventor
Karl J. Braun
By his Attorney
Vincent A. White

Aug. 28, 1962 K. J. BRAUN 3,051,374

HAND PUNCHES

Filed Aug. 31, 1959 4 Sheets-Sheet 2

United States Patent Office 3,051,374

Patented Aug. 28, 1962

3,051,374

HAND PUNCHES

Karl J. Braun, Springdale, Conn., assignor to A. Kimball Company, Brooklyn, N.Y., a corporation of New York Filed Aug. 31, 1959, Ser. No. 837,266

4 Claims. (Cl. 234—45)

This invention relates to recording apparatus. More particularly the invention is directed to a hand-held device suitable for punching code perforations in a record.

In the reading of domestic utility meters and the like, much time is consumed by meter readers in transcribing the identification number of each meter as well as the consumption indication itself. Such an operation is subject to errors both in the original transcription at the meter and in the retranscription of the identification and consumption data at a central point where the utility billings are processed. According to modern accounting practices such retranscription often is accomplished by manually key-punching a perforated tabulating card so that computation and processing can be automatically completed by business machines. However, the chance of error is magnified by the fact that accuracy depends on two manual operations, i.e., the meter reading and the key punching.

Accordingly, it is a general object of the invention to provide a recording apparatus suitable for creating a punched record at the source of information, viz, at the reading of the meter. The recording apparatus preferably is in the form of a hand-held punch for code punching a small record.

The type of record used in the preferred embodiment of the invention is in the form of a perforated tag of the general type disclosed in United States Letters Patent No. 2,692,083, granted October 19, 1954, to A. K. Marsh. The tag punching device is adapted to be hand-held and according to one feautre of the invention the device has provision for automatic punch selection to record the identification of the meter and for manual punch selection to record the consumption indication of the meter.

Since identification recording of the meter is automatic, one major source of error is eliminated. Thus, according to another feature of the invention, each meter is provided with an identification number which is coded in an external unit insertable into the hand-held device to effect the automatic selection of the punches used to code perforate the identification section of the record tag.

According to another feature of the invention provision is also made for manual selection of other punches to code perforate the consumption data read from the meter.

The above and other features of the invention, including various details of construction and novel combinations of parts will now be described with reference to the drawings and thereafter pointed out in the claims.

Figures 2, 3, 4:
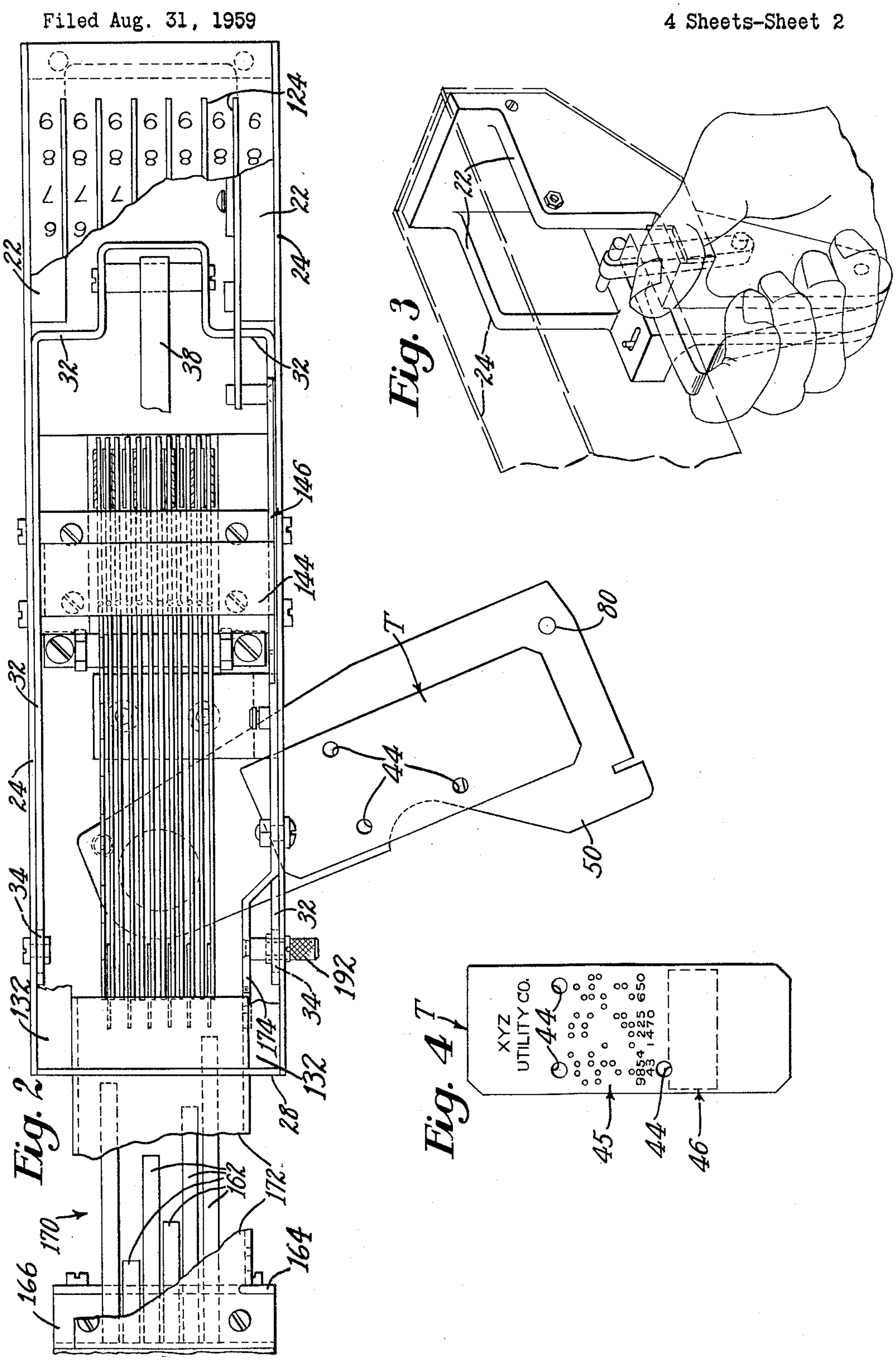
FIG. 2 is a plan view of the device with the top cover broken away.
FIG. 3 is a fragmentary perspective view showing the construction of the handle.
FIG. 4 illustrates a record tag.

The invention will now be described with reference to the punching of a record in the form of a perforated tag of the type generally described in United States Patent No. 2,692,083. As illustrated in FIG. 4, the tag T is provided with at least three locating holes 44 as well as with a plurality of punched information index point positions arranged in columns each adapted to encode a single bit of data. Uunder some circumstances the tag would be prepunched as in the field 45 with any desired coded information. According to the present embodiment, the hand punch to be described is adapted to perforate the tag in a field 46 with data automatically selected according to an identification number coded in an external unit, such as a utility meter, and with variable data manually selected according to information indicated on such a meter.

Figure 1:
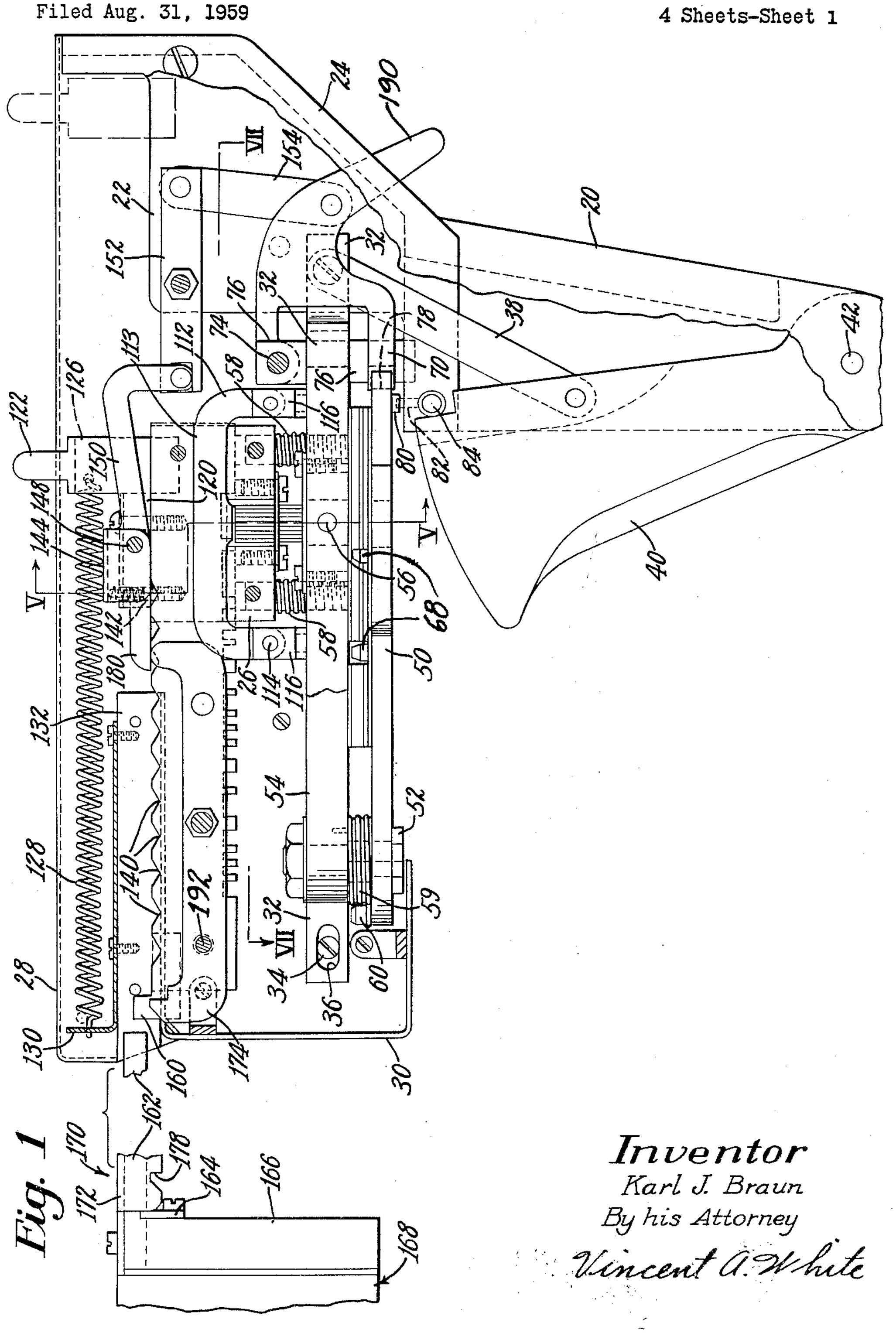
FIG. 1 is a side elevation of the hand punching unit showing one embodiment of the invention.

The hand punch for code punching the tag with the above data is provided with a handle 20 having upright side frames 22 to which are fixed a pair of side plates 24. The side plates are also secured together by a U-shaped block 26 (FIG. 5), a top cover 28 and a front cover 30 (FIG. 1). The tag support and a portion of the punching instrumentalities are carried by a bifurcated frame 32 (FIGS. 1 and 2) pivotally and slidably mounted at its open end on two blocks 34 secured to the side plates and riding in slots 36 in the frame. At the opposite end, the frame 32 is connected by a link 38 to a movable handle 40 which is pivotally mounted at 42 to the handle 20. As seen in FIG. 1, the link 38 and handle 40 forms a toggle for moving the frame 32 in heightwise directions.

Figure 5:
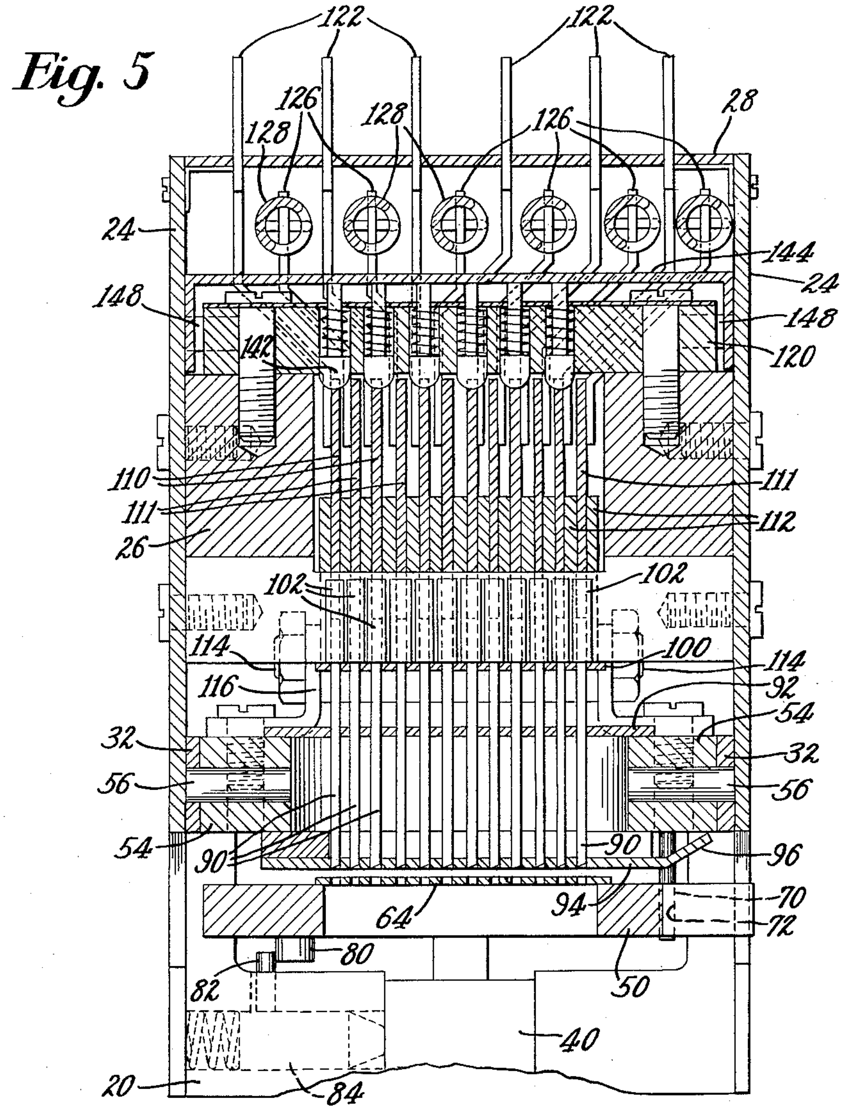
FIG. 5 is a section on line V—V of FIG. 1.
Figure 6:
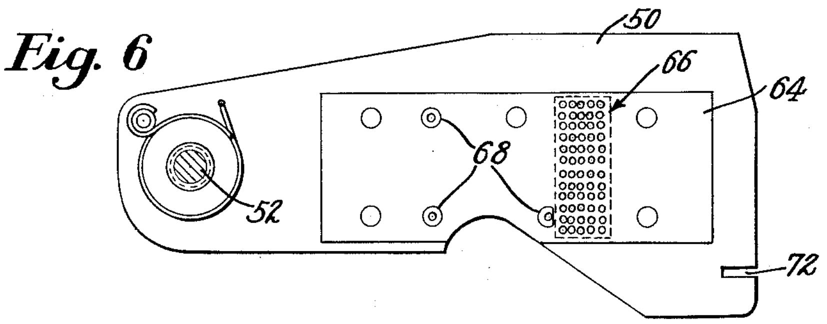
FIG. 6 is a plan view of the tag support.
Figure 7:
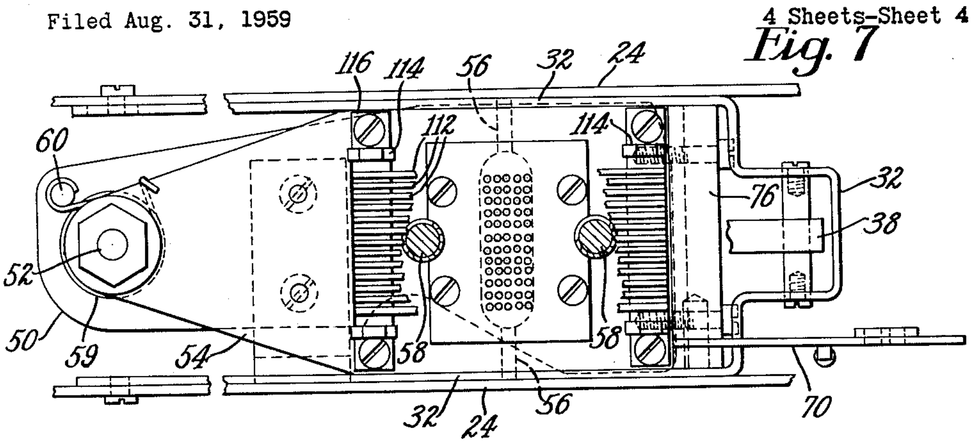
FIG. 7 is a plan view substantially on line VII—VII of FIG. 1.

For supporting the tag in punching position the device is provided with a tag support 50 which is pivoted on a vertical axis at 52 to a punch block 54. The punch block is carried by the frame 32 on horizontal trunnions 56. The block is also provided with vertical guide rods 58 received in bores in the fixed block 26. The support 50 is biased to an exposed position (see FIG. 2) for ease in tag placement, by a torsion spring 59 which at one end engages a pin 60 projecting upwardly from the support and which at the other end engages one edge of the block 54. The support is further provided with a die plate 64 (FIGS. 5 and 6) which is perforated at 66 at each possible index point position. For accurately positioning the tag, locating pins 68 project up from the die plate to be received in the locating holes 44 of the tag. After the tag is placed on the locating pins the support is swung about its pivot 52 against the action of the spring 59 until it is locked in punching position by a latch 70 which is received in a slot 72 in the support. As seen in FIG. 1, the latch is pivoted at its upper end on a pin 74 in a bracket 76 fixed at the rear of the punch block 54. The bracket 76 depends from the block 54 for guiding the latch and is provided with a groove 78 which receives the end of the support 50 to provide support against punching stress. As seen in FIGS. 1 and 5, the support 50 is provided with a depending pin 80 adapted to engage an extension 82 of a spring pressed lock pin 84 mounted in a horizontal bore in the upper end of the handle 20. The lock pin 84 is normally spring urged to a position preventing rearward movement of the handle 40, as most clearly seen in FIG. 1. When the support 50 is swung into punching position where it is locked by the latch 76, the pin 80 acting against the extension 82 moves the lock pin 84 out of the path of movement of the handle 40. Thus, it should be apparent that the handle 40 is released to allow tag punching only when the tag support is latched in punching position.

For code punching the tag, the hand punch is provided with sixty punches 90 (FIG. 5) which are arranged in twelve columns of five punches each corresponding to the code index positions. The punches are guided for heightwise movement by a perforated plate 92 secured to the upper side of the punch block 54 and by a perforated plate 94 secured to the under side of the block. The plate 94 is provided with an upturned camming surface 96 to insure that the tag is forced down and securely positioned on the die plate 64 when the support is moved into punching position. When the tag support is latched in punching position, it may be seen that the perforations 66 in the die plate are precisely alined with the punches. The upper ends of the punches are additionally guided by a stripper plate 100 secured to the under side of the block 26. Each punch is provided at its upper end with an enlarged head 102 which rests on the stripper plate prior to the punching operation.

For selecting the punches of each column for perforating the tag according to a predetermined code, there are provided six gag slides 110 and six gag slides 111, each of the slides being associated with an individual column of punches. Along the lower edge of each slide there are a plurality of lugs which cooperate with the punch heads to select the punches that are to be forced through the tag depending on the lengthwise position of the slide. The gag slides are guided for lengthwise movement by a comb-like unit 113 which passes through and straddles the block 26. The unit 113 is formed by a plurality of U-shaped plates 112 which are spaced apart by suitable washers and secured by bolts 114 to upturned lugs 116 fixed to the upper side of the punch block 54. The lower edges of the gag slides rest on a portion of the block 26 while the upper edges of the slides are confined against heightwise movement by a crossbar 120 secured to the upper edges of the block 26. Thus, the gag slides are guided against heightwise movement by the block 26 and the bar 120 while the plates 112 maintain spacing and prevent transverse movement of the slides. Referring to FIG. 5, it may be seen that the slides 110 are provided with upstanding handles 122 which extend through slots 124 (FIG. 2) in the top plate 28. The plate is provided with indicia for indicating to the operator the coded digital value of the position of each gag slide. The upper edge of each slide 110 is provided with a plurality of V-shaped detent notches 140 which cooperate with an individual spring pressed detent pin 142 (FIGS. 1 and 5) mounted in the crossbar 120, there being six detents for the six slides 110. Thus, each slide 110 is maintained by an associated detent in any one of the punch selecting positions to which it is manually set.

To prevent mispunching by virtue of improper positioning of any gag slide 110, the upper ends of the detent pins underlie a transverse plate 144. The plate is U-shaped in cross section (see FIG. 5) and is pivotally mounted by pins 148 at opposite sides of the crossbar 120. The plate also has a rearwardly extending arm 150 (FIG. 1) which through a lever 152 and link 154 is connected to the tag support latch 70. Thus, it should be apparent that if any slide 110 is not properly positioned with its detent 142 bottomed in a notch 140, then the detent will cause the plate 144 and arm 150 to rock clockwise, as seen in FIG. 1, to raise the latch 70 to prevent latching of the tag support with a resultant locking of the handle 40.

The gag slides 111 are interspersed between the slides 110 and are provided with upstanding lugs 126 to which are attached individual springs 128 which at their forward ends are secured to a plate 130 carried by lugs 132 secured to the side plates 24. Thus, it may be seen that each of the slides 111 is individually spring urged to the left to the position seen in FIG. 1. At the left end each of the slides 111 is provided with an upstanding lug 160 which is adapted to be engaged by an individual code rod 162.

Referring to FIGS. 1 and 2, it may be seen that there are six rods 162 of varying lengths repending on the digital value represented by each rod. The rods are accurately positioned by a key 164 and fixed to a bracket 166 which may be secured in any convenient manner to a utility meter 168. It should be noted that the rods 162 and bracket 166 form an identification unit 170 for the meter separate from the hand punch. The unit is provided with a cover 172 which protects the code rods on three sides and which coacts with a portion of the spring plate 130, front cover 30, and side rails or lugs 132 to guide the unit into the front of the hand punch. As the unit is inserted into the hand punch the code rods 162 engage the lugs 160 upstanding from the gag slides 111 to move the individual slides 111 rearwardly against the action of the springs 128. Each slide 111 is thus moved to a predetermined position depending on the length and digital value of its associated code rod. In this manner the gag slides are automatically set according to the indentification number of the meter to be read merely by insertion of the unit 170.

To ensure that the unit 170 is fully and accurately positioned in the hand punch before punching a tag, a latch 174 is pivotally mounted on one of the side plates 24 and offset into the path of a downstanding portion of the unit cover 172. When the unit is fully inserted into the hand punch, a notch 178 in the cover receives the end of the latch to lock the unit in the hand punch. Insertion of the unit causes the latch to rock counterclockwise from the position seen in FIG. 1. The latch at its rearward end engages an arm 180 extending from the rocking plate 144 so that movement of the latch rocks the plate clockwise to prevent latching of the tag support and further operation of the hand punch until the latch again rocks clockwise into the notch 178.

After the punches 90 have been selected as above described, and the tag support is latched in position, the operator squeezes the handles 20 and 40 together to cause the tag T to be punched. Squeezing the handles causes the frame 32 to be moved up, pivoting about the blocks 34. Through the trunnions 56 the punch block and tag support are also moved up. The tag moving up engages the lower ends of the punches. The punches that have been selected are held against heightwise movement by the lugs on the gag slides 110 and 111, and so are forced through the tag while the non-selected punches rise freely in notches in the slides. When the operator releases the handles 20 and 40 springs on the guide rods 58 cause the punch block and tag support to move down while the stripper plate 100 strips the punches from the tag. To remove the tag, an arm 190 extending from the latch 70 is raised to release the tag support for return to its exposed position. By depressing a knob 192 extending from the latch 174, the unit 170 is released for removal of the hand punch from the meter.

Having thus described my invention what I claim as novel and desired to secure by Letters Patent of the United States is:

1. A recording apparatus including a hand-held device presentable to individual units for recording data identifying each individual unit, said device including a plurality of punches for perforating data indications in individual records and settable slides associated with said punches for selecting said punches, means for locating said device in a fixed position with respect to each unit upon presentation thereto, coded identifiication means associated with each unit and insertable into said device upon presentation to said unit, said coded means being operable by the insertion thereof to set said slides to select associated punches according to the data coded in said coded means, a support for positioning a record in accurate registration with said punches, and manually operated means for imparting relative movement between the punches and the support for causing selected punches to perforate the record.

2. The invention according to claim 1; wherein resilient means is normally operable to hold said slides in an unset position and said coding means is operable to set said slides against the bias of said resilient means.

3. A recording apparatus including a hand-held device presentable to individual units for recording data identifying each unit and for recording variable data relating to said each unit, means for locating said device in a fixed position with respect to each unit upon presentation thereto, a coded identification means associated with each unit and insertable into said device upon presentation to said unit, said device including a plurality of punches for perforating data indications in individual records, a first set of slides settable by said coded means upon insertion for selecting associated punches according to the indentification data coded in said means, a second set of slides each manually settable for selecting associated punches according to the variable data to be recorded, a support for positioning a record in accurate registration with said punches, and manually operated means for causing selected punches to perforate the record.

4. Recording apparatus including a hand-held device presentable to individual units for recording data identifying each individual unit, means for locating said device in a fixed position with respect to each unit upon presentation thereto, coded indentification means associated with each unit and insertable into said device upon presentation to said unit, said coding means including a plurality of rods each of predetermined length depending on identification datum represented thereby, said device including a plurality of punches for perforating data indications in individual records, punch selecting slides each individually movable to a plurality of different positions for selecting different patterns of punches whereby upon insertion of said coding means each slide is moved to one of said different positions depending on the length of one of said rods engaged therewith thereby causing a pattern of punches to be selected corresponding to the datum represented by said one rod, a support for positioning a record in accurate registration with said punches, and manually operated means for causing the selected punches to perforate the record.

References Cited in the file of this patent

UNITED STATES PATENTS 2,008,396 Lasker ------------------ July 16, 1935

FOREIGN PATENTS 320,631 Great Britain ------------ Oct. 14, 1929

UNITED STATES PATENT OFFICE
CERTIFICATE OF CORRECTION

Patent No. 3,051,374 August 28, 1962

Karl J. Braun

It is hereby certified that error appears in the above numbered patent requiring correction and that the said Letters Patent should read as corrected below.

Column 2, line 3, for "Uunder" read -- Under --; line 24, for "forms" read -- form --; column 3, line 70, for "repending" read -- depending --; column 5, line 21, for "indentification" read -- identification --.

Signed and sealed this 3rd day of September 1963.

(SEAL)
Attest:

ERNEST W. SWIDER
Attesting Officer

DAVID L. LADD
Commissioner of Patents